April 4, 1961
C. E. McCOY ET AL
2,978,196
WIRE TENSION CONTROL DEVICE
Filed March 4, 1958
2 Sheets-Sheet 1
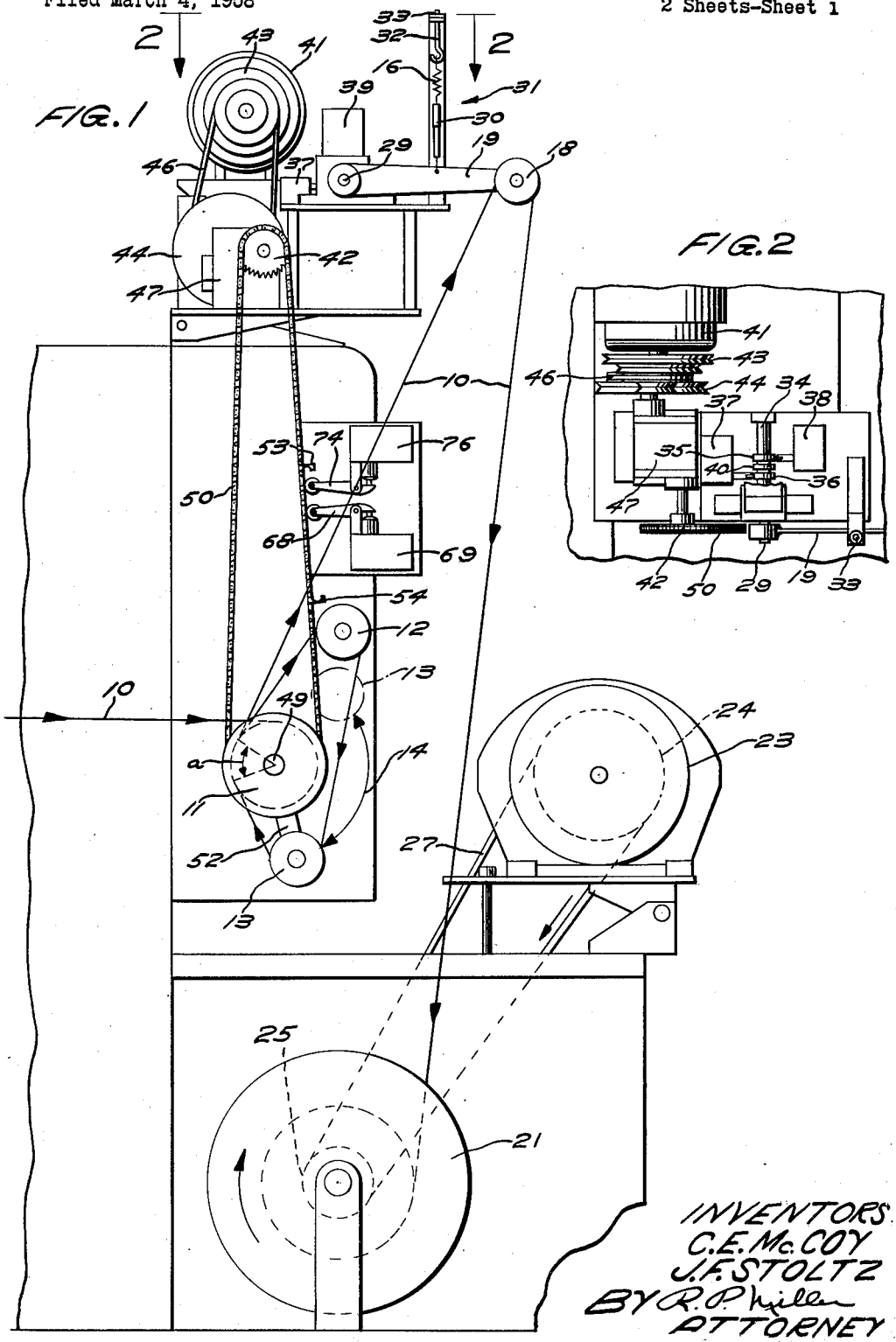
INVENTORS
C.E. McCOY
J.F. STOLTZ
BY R. Phillen
ATTORNEY April 4, 1961
C. E. McCOY ET AL
2,978,196
WIRE TENSION CONTROL DEVICE
Filed March 4, 1958
2 Sheets-Sheet 2
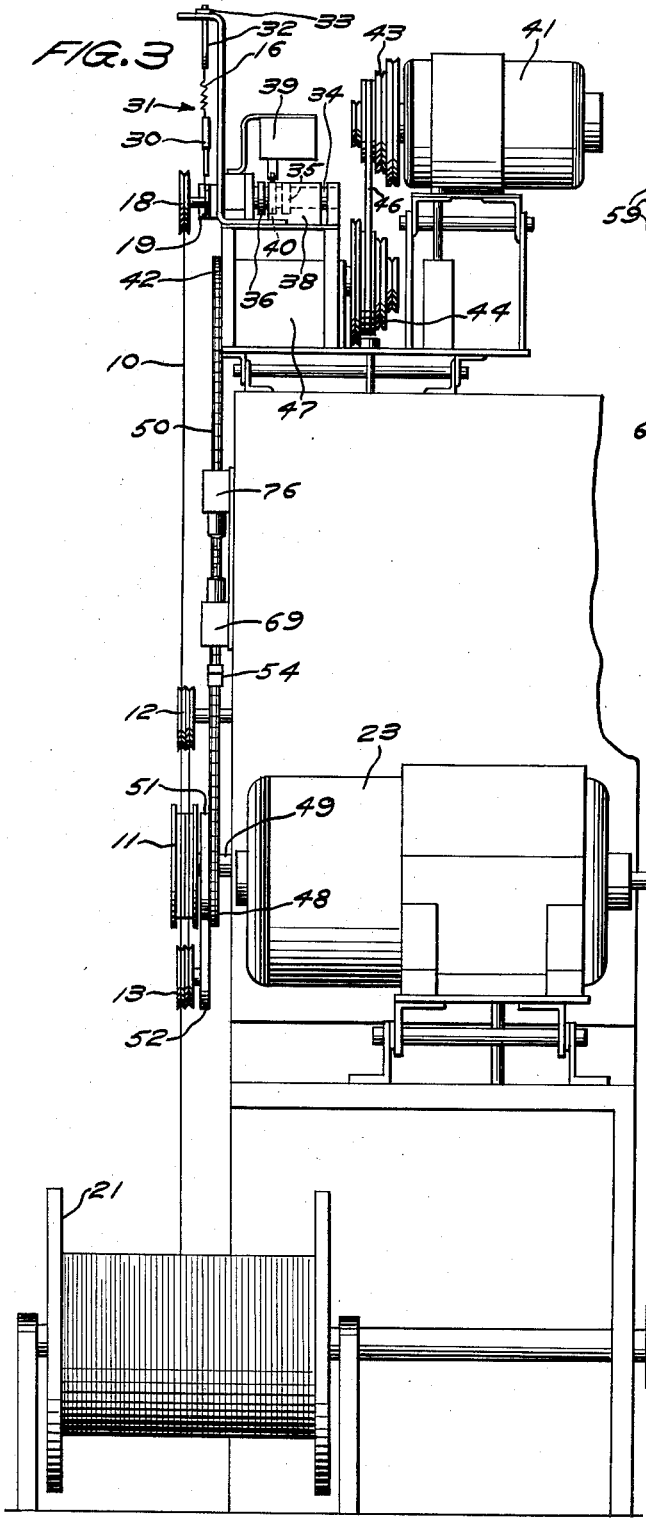
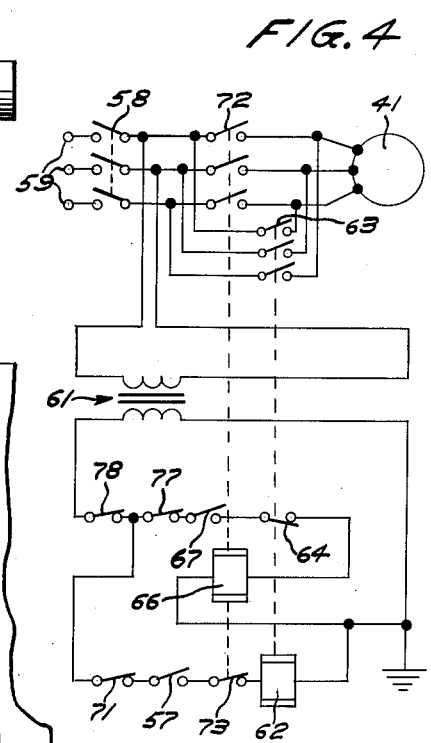
INVENTORS
C.E.McCOY
J.F.STOLTZ
BY R.P. Miller
ATTORNEY

United States Patent Office 2,978,196
Patented Apr. 4, 1961

2,978,196

WIRE TENSION CONTROL DEVICE

Clarence E. McCoy, Fairhope, Ala., and James F. Stoltz, La Grange, Ill., assignors to Western Electric Company, Incorporated, New York, N.Y., a corporation of New York Filed Mar. 4, 1958, Ser. No. 719,105

6 Claims. (Cl. 242—45)

This invention relates to a wire tension control device, and more particularly to a control means for automatically positioning a movable sheave for maintaining a constant tension on a travelling wire.

A general object of the invention is to provide new and improved wire tension control devices.

In wire manufacturing processes, the necessity often arises for different values of tension to be placed upon the wire being manufactured between one wire manufacturing station and another. For instance, the amount of tension placed on a wire in a wire drawing process far exceeds that which is required for winding the wire upon a take-up reel or for many other types of wire working processes. One method of reducing or changing the tension on the wire between manufacturing stations is by means of a triangular arrangement of a capstan, a stationary sheave, and a movable sheave where the capstan is driven faster than the speed of the wire. This arrangement is constructed to vary the tension on the wire by adjusting the position of the movable sheave to increase or decrease the angular contact, and, therefore, the amount of friction, between the wire and the capstan. The angle of contact in the past has been controlled manually by an operator, with each operator using his own judgment and discretion as to where the movable sheave should be placed to obtain the desired change in tension and, as a result, a uniform tension has not been produced. Another limitation has been found in the triangular arrangement of capstan and sheaves in that once the movable sheave has been correctly positioned to produce the desired tension, there is no means for compensating for the gradual change in tension due to the wear of the apparatus, as on a wire drawing die or on the grooves formed around the periphery of the capstan.

It is therefore an object of this invention to overcome these disadvantages by providing an improved tension control apparatus which will automatically position a movable sheave to obtain a preselected value of tension on a travelling wire.

Another object of the invention is to provide a tension control device for detecting small variations in tension on a travelling wire and changing the angle of contact between the wire and a capstan in accordance with the tension variations to maintain a constant tension.

With these and other objects in view, the present invention contemplates means for automatically controlling a tension changing device for maintaining a constant tension on a travelling wire. The wire is fed from a first wire manufacturing station, such as a wire drawing die, around a triangular arrangement of a capstan, a stationary sheave, and a movable sheave. The capstan is driven faster than the speed of the wire to produce friction between the wire and capstan. The wire is then passed over a third sheave which is connected to one end of a pivoted tension-sensitive arm and then is fed to a second wire manufacturing station or a take-up reel which requires a different tension on the wire than was required at the first wire manufacturing station. Switches are positioned in relation to the tension-sensitive arm such that a reversible motor is controlled upon the movement of the arm under variations in tension on the wire from a preselected tension. The reversible motor is connected to the movable sheave in the triangular arrangement such that the sheave may be positioned in accordance with the tension variations detected by the arm to vary the angle of contact between the wire and capstan and thereby maintain the tension on the wire at the preselected value.

Other objects, advantages and novel features of the invention will become apparent upon consideration of the following detailed description in conjunction with the accompanying drawings wherein:

Fig. 1 is a front elevational view of a tension control apparatus embodying the features of the present invention;

Fig. 2 is a fragmental top elevation view of the tension control apparatus shown in Fig. 1 partially cut away to illustrate a bank of control cams;

Fig. 3 is an end elevation view of the tension control apparatus shown in Fig. 1; and Fig. 4 is a circuit capable of interconnecting and controlling a tension-sensitive device with a tension adjusting apparatus in accordance with the practice of the present invention.

Attention is now directed to Figs. 1 and 3 wherein a wire 10 is fed from a first wire manufacturing station, such as a wire drawing machine or any type of wire working apparatus (not shown), to a capstan 11. The capstan 11 is driven by a motor (not shown) at a speed greater than the speed of a wire to produce slippage between the wire and the capstan. The wire 10 is wrapped one or more times around the capstan 11 and then over a stationary sheave 12. From the sheave 12, the wire is fed around a sheave 13, which is movable through an arc 14 about the axis of the capstan, and then is fed back over the capstan 11. The capstan 11 and sheaves 12 and 13 form a triangular arrangement around which the wire is fed one or more times and, together, constitute a wire-advancing unit of a known type, such as is disclosed in H. Zarafu Patent 2,140,728.

After the wire 10 leaves the triangular arrangement of capstan 11 and sheaves 12 and 13, the wire passes over a third or control sheave 18 connected to a tension-sensitive arm 19 and then on to a second wire manufacturing station requiring a different value of tension on the wire than was required at the first station. The second station may be, for example, a take-up reel 21 driven by a motor 23, by means of sheaves 24 and 25 connected by a belt 27. The arm 19 is pivotally mounted on a shaft 29 and is urged upwardly by a spring biased damping member 31, which may comprise a dash-pot 30 and a spring 16 connected to a threaded hook 32. The force exerted on the arm 19 by the damping member 31 may be adjusted by means of the threaded hook 32 and a nut 33. This force is adjusted to be equal and opposite to the force of a preselected standard exit tension on the wire, such that the arm 19 will assume a neutral or horizontal position when the desired tension is on the wire.

The shaft 29 is connected to a cylindrical body 34 (Figs. 2 and 3) which carries three peripheral cams 35, 36 and 40. The cams are so positioned that upon rotation of the shaft 29 and the cylindrical body 34, switches 37, 38 and 39 will be actuated depending upon the direction of rotation of the cylindrical body. The switches 37, 38 and 39 control a reversible motor 41 of any suitable type which will, in turn, drive a sprocket wheel 42. The speed of the motor 41 is reduced by means of a pair of four-stepped cone V belt pulleys 43 and 44 connected by means of a belt 46. The lower pulley 44 drives a gear-reducing mechanism contained in a housing 47 which further reduces the effective speed of the motor.

The sprocket wheel 42 is connected to a second sprocket wheel 48 by means of a chain 50. The wheel 48 is positioned on, but not rotatable with, a shaft 49 which drives the capstan 11 to enable the wheel to rotate independently of the shaft 49. The sprocket wheel 48 carries a hub 51 which supports the movable sheave 13 by means of a radially extending arm 52. The chain 50 carries a pair of stops 53 and 54 which are positioned to engage a pair of limiting switches 69 and 76, which are connected to stop the motor 41 if the movable sheave 13 is caused to revolve about the capstan 11 an excessive amount in either direction.

The revolution of the sheave 13, around the shaft 49, along the arc 14 varies the angle of contact between the wire 10 and the capstan 11 which, in turn, varies the amount of slippage and friction between the wire and the capstan to adjust the amount of tension on the wire past the triangular arrangement of capstan 11 and sheaves 12 and 13. Tension on the wire past the triangular arrangement is controlled according to the relationship:

$$\frac{T_1}{T_2} = e^{ua}$$

wherein "$T_1$" is the tension in the wire before the triangular arrangement; "$T_2$" is the tension in the wire after the triangular arrangement; "$e$" is the base of natural logs; "$u$" is the coefficient of friction between the wire 10 and capstan 11; and "$a$" is the angle of contact in radians of the wire on the capstan. The tension on the wire before the triangular arrangement, assuming the wire to be coming from a wire drawing die, will be constant as will the coefficient of friction between the wire 10 and the capstan 11. It may be noted that the tension after the triangular arrangement, may be controlled by adjusting the angle of contact of the wire on the capstan. Therefore, upon the selection of the standard value of tension to be maintained after the triangular arrangement, the required angle of contact between the wire and the capstan may be determined and the damping member 31 may be adjusted to position the tension-sensitive arm 19 in a horizontal position when the predetermined angle of contact is obtained.

Fig. 4 discloses a simplified circuit which may be used to control the operation of the movable sheave 13. If, for example, the tension on the wire 10 decreases below the preselected tension, the force exerted on the tension-sensitive arm 19 by the damping member 31 will move the arm 19 upwardly thereby rotating the cylindrical body 34 in a counterclockwise direction. As the cylindrical body rotates, the cam 35 will engage and retract the plunger of the switch 38. Operation of the switch 38 will close contacts 57 and, assuming a main power switch 58 to be closed, current will be fed from two of the main bus lines 59 through a transformer 61 to energize a relay 62. The operation of the relay 62 closes contacts 63 which supply current to the motor 41 to drive the motor in a reverse direction. Relay 62 also opens safety contacts 64 which prevent the possibility of the operation of a relay 66 which would tend to drive the motor 41 in a forward direction. When energized through the contacts 63, the motor 41 will drive the sprocket wheel 42 in a counterclockwise direction (Fig. 1) which will, in turn, revolve the movable sheave 13 in a counterclockwise direction about the capstan 11. As the sheave 13 so revolves, the angle of contact between the wire 10 and the capstan 11 will increase, thereby increasing the slippage and friction between the wire and capstan causing the tension on the wire to increase.

If the tension on the wire increases to such an extent that the tension-sensitive arm 19 again reaches the horizontal position, the cam 35 on the cylindrical body 34 will disengage the plunger of the switch 38 to open the contacts 57 and de-actuate the relay 62 to stop the motor 41. If the tension on the wire 10 has decreased to the point that it is beyond the range of the present device to increase the tension to the preselected value before sheave 13 has been moved to the uppermost position, the stop 54 will engage an arm 68 on the limit switch 69, causing the switch to open contacts 71 to break the circuit of relay 62 and thus prevent further rotation of the sheave 13.

Assuming, on the other hand, that the tension on the wire 10 were to increase beyond the preselected value of tension, the operation of the arm 19, motor 41 and sheave 13 would be similar to that set forth above, in that, the cam 36 on the cylindrical body 34 would engage the plunger of the switch 37 which would, in turn, close contacts 67. Closure of the contacts 67 would complete a circuit through relay 66 to close contacts 72 connecting the motor 41 to run in the forward direction. Relay 66 would also open safety contacts 73 which would prevent faulty operation of relay 62. The motor 41, running in its forward direction would rotate the sprocket wheel 42, and thereby revolve the sheave 13, in a clockwise direction about the capstan 11. The revolution of the sheave 13 will continue until the tension in the wire again reaches the preselected value or until the stop 53 engages an arm 74 of the limiting switch 76 which will open contacts 77 to break the circuit of the relay 66 and stop the motor 41.

In case of a wire break, the tension in the wire will drop to zero and the arm 19 will be rotated upwardly, instantaneously operating the switch 37. When the arm 19 reaches its uppermost position, the third cam 40 on the cylindrical body 34 will retract the plunger of the switch 39 to open wire break contacts 78 and, therefore, prevent the operation of motor 41 through either relay 62 or 66.

It may also be noted that once the present device is operating under stable conditions, that is, at the preselected tension "$T_2$" and predetermined angle of contact "$a$," compensation will be obtained for any changes in the tension "$T_1$" caused, for instance, by wear on the drawing die, or for any changes in the coefficient of friction "$u$" due to the wear of the wire on the capstan. This compensation will be obtained because, once the arm 19 has been set to maintain the preselected tension "$T_2$" constant, the angle of contact will change upon a change of "$u$" or "$T_1$" to maintain the arm 19 in a horizontal position. The dash-pot 30 is connected between the arm 19 and the spring 16 to prevent the control apparatus of the present invention from operating under small instantaneous variations in tension. If such an operation were allowed, the arm 19 would continuously be hunting for stable operating conditions under tension variations which would not materially affect the operation of the second manufacturing station.

It is to be understood that the above-described operation, arrangement of apparatus, and construction of elemental parts are simply illustrative of the application of the principles of this invention and many other modifications may be made thereto without departing from the scope and spirit of the invention.

What is claimed is:

1. A wire tension control apparatus, comprising a capstan for advancing a wire, a first sheave and a second sheave around which the wire is fed, said second sheave being movable about the axis of the capstan to vary the angle of contact between the wire and the capstan, a pivoted tension-sensitive arm carrying a third sheave for receiving the wire leaving the capstan and being urged downwardly under the force of the tension on the wire, a spring-biased damper for urging the arm upwardly to balance the force of a preselected tension on the wire leaving the capstan, and a reversible motor operated by the movement of the arm in response to variations from the preselected tension and connected to said second sheave to move said second sheave about the capstan to vary the angle of contact between the wire and the capstan.

2. In a tensioning control device a triangular arrangement of a capstan, a first sheave and a second sheave around which a wire is fed, said second sheave being movable about the axis of the capstan to vary the angle of contact between the wire and the capstan; a spring-biased tension-sensitive arm pivoted at one end and supporting a third sheave on the other end over which the wire is fed for detecting variations in tension from a preselected value; and a reversible motor controlled by the movements of said arm in accordance with the variations in tension on the wire and connected to said second sheave to change the position of the second sheave to maintain a constant tension.

3. A device for controlling tension on a travelling wire comprising a capstan for guiding the wire, a stationary sheave for receiving the wire from the capstan, a movable sheave for receiving the wire from the stationary sheave and guiding the wire back to the capstan, said capstan and sheaves forming a triangular arrangement, a spring-biased tension-sensitive arm having a sheave on one end thereof for receiving the wire from the triangular arrangement and movable under variations of tension on the wire, a reversible motor operated by said tension-sensitive arm upon variations of tension on the wire from a preselected value, and a drive chain connecting the movable sheave to the motor for adjusting the position of the movable sheave to effectuate a constant tension.

4. A wire tension control apparatus comprising, a capstan for advancing a wire, a first and a second sheave about which the wire is fed, said second sheave being movable about the axis of the capstan for receiving a wire from the capstan and guiding the wire back to the capstan, a pivoted tension-sensitive arm carrying a rotatably mounted third sheave for receiving the wire leaving the capstan and being urged downwardly under the force of the tension on the wire, a spring-biased damper for urging the arm upwardly to balance the force of a preselected tension on the wire leaving the capstan, a shaft having a pair of cams thereon and concentric with the axis of rotation of the arm and connected thereto for rotary movement upon pivotal movement of the arm due to variations in tension from the preselected tension, a first switch operable by a first of the cams upon rotation of the shaft in a forward direction, a second switch operable by a second of the cams upon rotation of the shaft in a reverse direction, and a reversible motor connected to the second sheave and operable in forward and reverse directions by the first and second switches for moving the second sheave about the capstan to vary the angle of contact of the wire leaving the second sheave on the capstan.

5. A tension control device comprising the triangular arrangement of a capstan, a first sheave and a second sheave around which a wire is fed; said second sheave being revoluble about the axis of the capstan to vary the angle of contact between the wire and the capstan; a pivoted tension-sensitive arm supporting a third sheave for receiving the wire from the triangular arrangement; a spring-biased damper for urging the arm upwardly against the force of a preselected tension on the wire; a shaft having a pair of cams thereon and concentric with the axis of rotation of the arm and connected thereto for rotary movement upon pivotal movements of the arm due to the variations in tension from the preselected tension; a first switch operable by a first of the cams upon rotation of the shaft in a forward direction; a second switch operable by a second of the cams upon rotation of the shaft in a reverse direction; a reversible motor operable in forward and reverse directions by the operation of said first and second switches; and a drive chain connecting the second sheave to the motor for positioning the second sheave to maintain a constant tension.

6. In combination with a wire-advancing unit of the type having a driven capstan and at least two spaced sheaves, about all of which the wire passes in a closed loop, and further of the type wherein the exit tension in the wire may be altered by moving at least one of such sheaves to change the angle of contact between the wire and the capstan; an automatic tension adjusting mechanism for such a unit, which comprises a control sheave arranged in spaced relationship to the wire-advancing unit so that the wire issuing from that unit passes around a substantial arc on the periphery of said control sheave thereby exerting a force proportional to the exit tension in the wire tending to move said control sheave in a first direction; means for mounting said control sheave for movement both in said first direction and in the opposite direction thereto; adjustable means for biasing said control sheave in said opposite direction with a force precisely counterbalancing the force exerted by the wire when under a predetermined standard exit tension so that said control sheave normally assumes a neutral position, whereby when the exit wire tension is above standard said control sheave moves from the neutral position in said first direction and when the exit wire tension is below standard said control sheave moves from the neutral position in said opposite direction; and control means actuated by movement of said control sheave from the neutral position for automatically moving one of the sheaves in the wire-advancing unit in such direction that the angle of contact between the wire and the capstan is varied so as to re-establish the standard exit tension, thus recounterbalancing said control sheave and moving the same back to the neutral position, after which said control means is deactuated.

References Cited in the file of this patent

UNITED STATES PATENTS 2,140,728　　Zarafu _____ Dec. 20, 1938

FOREIGN PATENTS 365,980　　Great Britain _____ Jan. 28, 1932